(12) United States Patent
Bradburn et al.

(10) Patent No.: US 7,766,369 B2
(45) Date of Patent: Aug. 3, 2010

(54) AIR-BAG

(75) Inventors: Alan Bradburn, Stoke on Trent (GB); Christopher McHugh, Lancs (GB); Hugh Finn, Warrington (GB)

(73) Assignee: Autoliv Development AB, Vargarda (SE)

( * ) Notice: Subject to any disclaimer, the term of this patent is extended or adjusted under 35 U.S.C. 154(b) by 361 days.

(21) Appl. No.: 10/587,106

(22) PCT Filed: Feb. 1, 2005

(86) PCT No.: PCT/SE2005/000113

§ 371 (c)(1),
(2), (4) Date: Jun. 25, 2008

(87) PCT Pub. No.: WO2005/075258

PCT Pub. Date: Aug. 18, 2005

(65) Prior Publication Data

US 2008/0252046 A1 Oct. 16, 2008

(30) Foreign Application Priority Data

Feb. 6, 2004 (GB) ................................. 0402666.2

(51) Int. Cl.
*B60R 21/16* (2006.01)
(52) U.S. Cl. .................................. 280/728.2
(58) Field of Classification Search .............. 280/730.2, 280/743.1, 728.2; 139/384 R; 442/181
See application file for complete search history.

(56) References Cited

U.S. PATENT DOCUMENTS

| | | | |
|---|---|---|---|
| 5,902,672 A | 5/1999 | Swoboda et al. | |
| 6,447,003 B1 * | 9/2002 | Wallentin et al. | 280/728.2 |
| 6,632,753 B1 | 10/2003 | Beasley, Jr. | |
| 6,698,458 B1 * | 3/2004 | Sollars et al. | 139/389 |
| 2002/0195803 A1 | 12/2002 | Terbu et al. | |
| 2003/0060104 A1 | 3/2003 | Velga | |

FOREIGN PATENT DOCUMENTS

| | | |
|---|---|---|
| EP | 0018335 | 10/1980 |
| GB | 2297950 A | 8/1996 |
| WO | WO-9627702 A1 | 9/1996 |
| WO | WO-99/32332 | 7/1999 |

* cited by examiner

*Primary Examiner*—Faye M. Fleming
(74) *Attorney, Agent, or Firm*—Harness, Dickey & Pierce, P.L.C.

(57) ABSTRACT

An air-bag is disclosed which is formed from fabric (12, 13) and has an inflatable region (1), and at least one protruding mounting tab (9). The or each mounting tab (9) is formed from fabric woven to have a random or quasi-random, distribution of floats. In a preferred embodiment, the floats each pass over between two and eight underlying yarns.

13 Claims, 3 Drawing Sheets

AIR-BAG

The present invention relates to an air-bag and more particularly relates to an air-bag provided with one or more mounts, such as apertured mounts, to mount the air-bag in position.

It has been proposed previously to provide many types of air-bag which incorporate a mounting region or mounting tabs to mount the air-bag in position. One particular form of air-bag of this type is the so-called inflatable curtain. An air-bag of this type is disclosed in GB2297950A.

FIG. 1 illustrates part of an inflatable curtain air-bag. The air-bag has an inflatable region 1 which has a generally linear upper edge 2. The inflatable region 1 is formed by two superimposed layers of fabric which are secured together at selected regions. In some cases the air-bag is formed using a one-piece weaving process, in which selected regions of the two layers of fabric are co-woven to form a single layer of fabric. In the part of the air-bag shown in FIG. 1, the two layers of fabric of the inflatable region are woven together in an area 3 to form an non-inflatable area, and are also woven together in regions 4 and 5 which form seams separating individual inflatable cells 6 and 7. A gas supply duct 8 is defined which extends adjacent the upper edge 2 of the air-bag, as is conventional. The gas supply duct is in fluid communication with the inflatable cells 6, 7.

The upper edge 2 of the air-bag is provided with a plurality of protruding mounting tabs 9 each provided with an aperture 10. The mounting tabs may be used to mount the air-bag in position.

On inflation of the air-bag, when mounted in position in a motor vehicle by the mounting tabs 9, a very substantial force is applied to the mounting tabs. In order to minimise the risk of the tabs tearing under such forces, it has been proposed to reinforce the mounting tabs by providing extra material, or by folding the material over on itself to increase the thickness of the mounting tabs, or by providing additional reinforcing sewing. All of these expedients, however, increase the weight and cost of the air-bag.

In other forms of air-bag the mount may be a ring-shaped mount surrounding a large aperture that receives a gas generator. The mount typically has apertures to receive bolts on a flange of the gas generator. Again the mount is typically reinforced by making the mount of increased thickness, or by sewing on an extra layer of reinforcing fabric.

The present invention seeks to provide an improved air-bag.

According to the present invention, there is provided an air-bag, the air-bag being formed from fabric and having an inflatable region and at least one mount, the or each mount being formed from fabric woven to have a random or quasi-random distribution of floats.

A float occurs whenever a warp yarn passes over or under two or more weft yarns, and when a weft yarn passes over or under two or more warp yarns. By "random or quasi-random distribution of floats" it is meant that the pattern of floats provided in any particular mount of the air-bag give the overall appearance of being random, with no order or correlation between the positioning of the floats and the number of yarns passed over or under by each float. The nature of the random selection of floats is, however, preferably biased so that there are a greater number of floats over two yarns than there are of any other type of float. Of course, in a manufactured product, the nature of the tabs on each successively produced air-bag will be identical, as the precise nature of the weave will be predetermined. Thus, even in the preferred embodiment of the invention as manufactured the floats will only be quasi-random, or pseudo-random, although it is contemplated that it may be possible to use a random number signal generator to generate genuinely random floats in a manufacturing process that could be used to fabricate an air-bag of the type presently described.

Preferably, the floats each pass over between two and eight underlying yarns.

Advantageously, the or each mount is formed from two adjacent layers of fabric. Each of the two layers of fabric is woven to have the random or quasi-random distribution of floats.

Conveniently, the two adjacent layers of fabric forming the mount are stitched together.

Alternatively the two adjacent layers of fabric forming the mount are laser-cut. In this way the outer edges of the layers of fabric become thermally bonded together.

Conveniently each mount is a protruding mounting tab.

Advantageously each mount is apertured.

Preferably the air-bag is an inflatable curtain.

Conveniently the inflatable curtain has an inflatable region formed by two super-imposed layers of fabric which are secured together at selected regions to form individual inflatable cells, there being a gas supply duct in fluid communication with the inflatable cells.

According to another aspect of this invention there is provided an air-bag, the air-bag being an inflatable curtain, the air-bag being formed from fabric and having an inflatable region formed by two super-imposed layers of fabric which are secured together at selected regions to form individual inflatable cells, there being a gas supply duct in fluid communication with the inflatable cells, the air-bag being provided with at least one mount, the or each mount being formed from fabric woven to have a random or quasi-random distribution of floats, each mount being in the form of a protruding mounting tab, the mounting tab being provided with an aperture.

In order that the invention may be already understood, and so that further features thereof may be appreciated, an embodiment of the invention will now be described, by way of example, with reference to the accompanying drawings in which.

In the preferred embodiment of the invention at least the mounting tabs of an air-bag are made using a specific weave, which incorporates a random distribution of floats, which will be described hereinafter. In the preferred embodiment the mounting tabs are made by two layers of this fabric which are stitched together.

Figure 1:
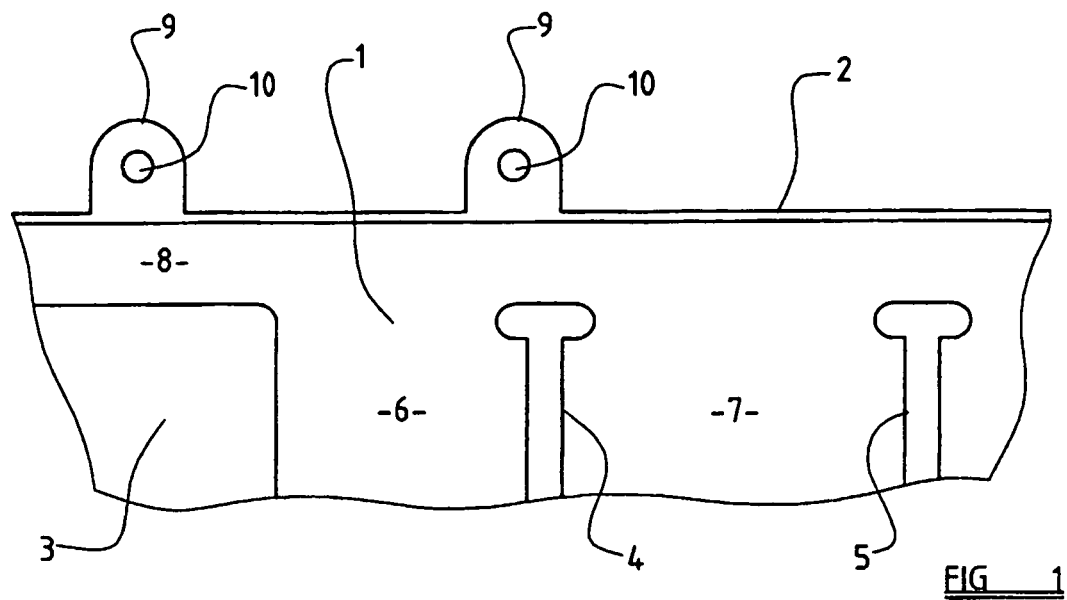
FIG. 1 is a perspective view of part of a prior proposed air-bag.
Figure 2:
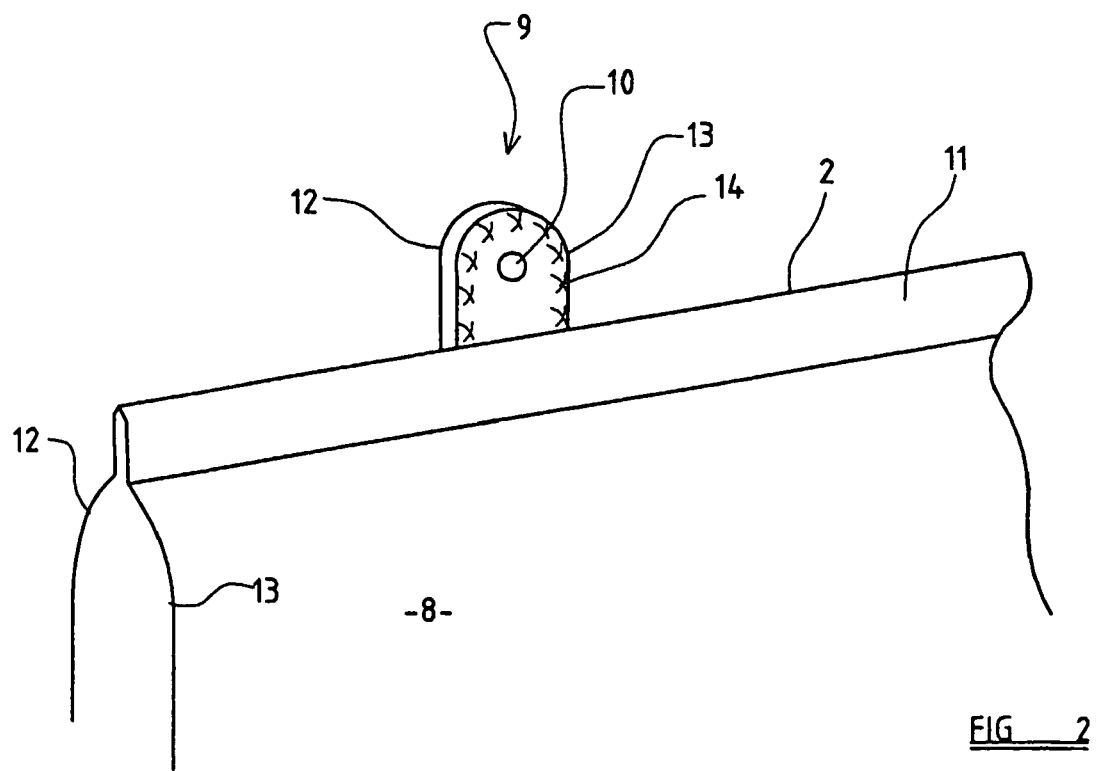
FIG. 2 is an enlarged view of part of an air-bag in accordance with the present invention.

Referring to FIG. 2 of the accompanying drawings part of an air-bag in accordance with the invention is shown, the air-bag being an air-bag having a design corresponding generally to that of the air-bag as shown in FIG. 1. Thus the air-bag of FIG. 2 is an inflatable curtain air-bag having an inflatable region with a generally linear or straight upper edge, the inflatable region being formed by two super-imposed layers of fabric which is secured together at selected regions. The air-bag incorporates seams separating individual inflatable cells. It can be seen that in the embodiment illustrated in FIG. 2, the air-bag is formed using a one-piece weaving technique. The upper-most edge 2 of the air-bag is formed into a substantially gas impermeable seam 11 by co-weaving two separate layers of fabric which form the rest of the air-bag, a one-piece weaving technique being utilised. The two separate layers of fabric 12, 13 diverge beneath the seam 11 to form the gas flow duct 8.

The mounting tab 9 which extends upwardly from the upper edge 2 of the air-bag is again formed from the two layers 12, 13 of fabric, but in the region of the tab, the layers 12, 13 of fabric are stitched together by a peripheral line of stitching 14, to provide the tab with the desired integrity. Alternatively, the tabs may be laser-cut from the fabric, the edges of the fabric layers of each tab being molten and fused together to provide the desired integrity. The mounting tab is again provided with a central aperture 10.

In the region of the tab 9 a "special" weave is utilised for the fabric as will now be described.

Figure 3:
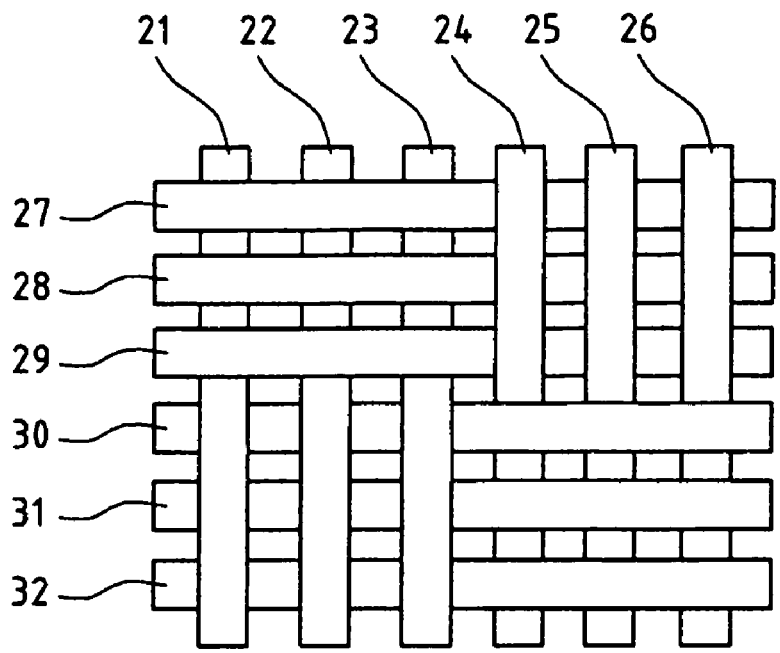
FIG. 3 is a diagrammatic view illustrating typical hopsack fabric weave.

In many prior proposed air-bags a hopsack weave is used for the fabric of the air-bag. A hopsack weave is illustrated in FIG. 3. In a hopsack weave, a plurality of immediately adjacent warp yarns pass together "in parallel" over and under selected groups of weft yarns which also pass over and under precisely the same sets of warp yarns. Referring to FIG. 3, six warp yarns 21 to 26 and six weft yarns 27 to 32 are illustrated. It can be seen that the first three warp yarns 21 to 23 form a group of warp yarns which extend "in parallel", passing over and under exactly the same sets of weft yarns. Also it can be seen that the warp yarns 24 to 26 form a second group of yarns which pass over and under the same selected sets of weft yarns in a similar fashion. Similarly the weft yarns 27 to 29 form a group of yarns which extend "in parallel" over and under the same sets of warp yarns, and the weft yarns 30 to 32 form a second group which pass over and under the same selected sets of warp yarns.

Thus, in this embodiment, of hopsack, groups of three warp yarns pass over and under groups of three weft yarns and vice versa. Hopsack can be created using groups of yarns comprising two or more yarns in each group. A hopsack weave is easy to fabricate, but does not have substantial tear-resistance.

The embodiments of the invention utilise a new weave, the weave having a random or quasi-random distribution of "floats". A "float" is where one yarn passes over or under at least two transversely extending yarns. In preferred embodiments of the invention, the floats may extend up to a length such that a float will cover eight transversely extending yarns. It is envisaged that, in a preferred embodiment, in each area of woven fabric where there are twelve warp yarns and twelve weft yarns, there will be at least twenty floats, with the floats each having a number of floated-over yarns of between two yarns and eight yarns. It is preferred that in each area of woven fabric where there are twelve warp yarns and twelve weft yarns there will be at least twenty floats of two yarns and at least five floats of three or more yarns. It is envisaged that there may be at lest six floats of three yarns or more, such as, for example, at least two floats of three yarns, at least two floats of four yarns and at least two floats of more than four yarns.

Figure 4:
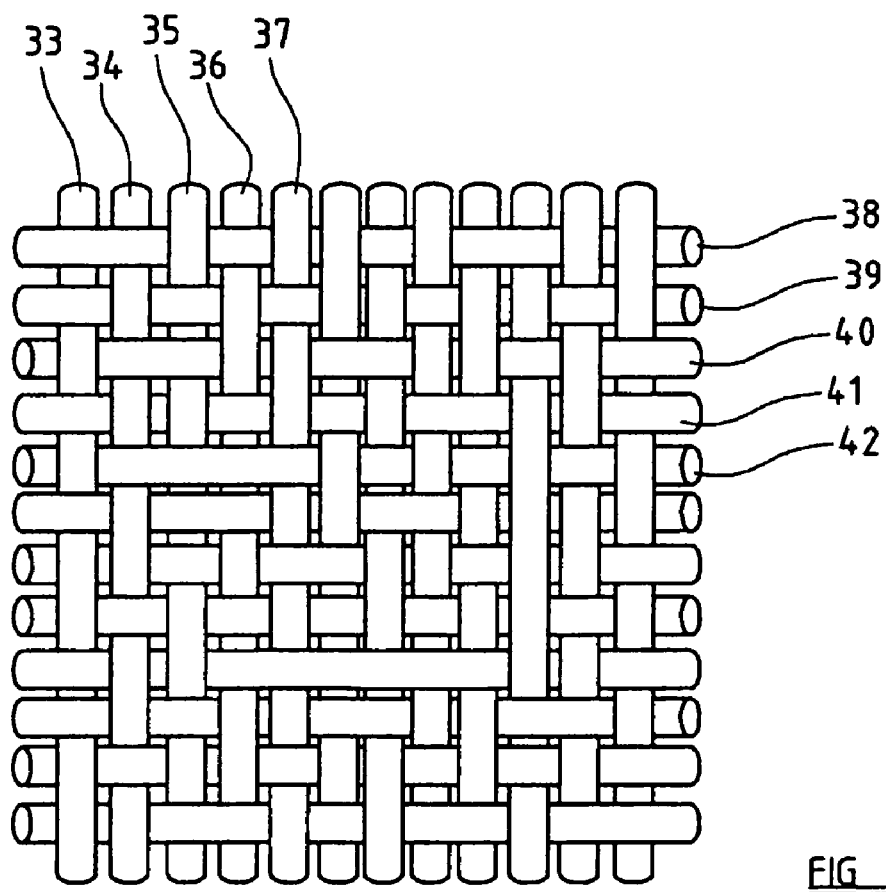
FIG. 4 is a diagrammatic view illustrating a weave as used in the invention.

FIG. 4 illustrates an example of the weave of the invention. FIG. 4 illustrates a plurality of warp yarns including yarns 33 to 37 interwoven with a plurality of weft yarns including weft yarns 38 to 42.

It can be seen that the weft yarn 38 initially passes over the two warp yarns 33, 34 together forming a float, and passes under the warp yarn 35, over the warp yarn 36, and then continues. The weft yarn 39 passes over the warp yarn 33, beneath the warp yarn 34, over warp yarn 35, beneath warp yarn 36 and over warp yarn 37 and thus, in the region described, does not experience any "floats". The weft yarn 40 passes under the warp yarn 33 and then above the two warp yarns 34, 35 forming a float, then passing under the next two adjacent warp yarns 36, 37 forming another float.

The weft yarn 41 passes over the warp yarn 33, beneath the next adjacent warp yarns 34, 35 forming a float, above the warp yarn 36, and beneath the next adjacent warp yarn 37. The weft yarn 42 passes beneath the warp yarn 33, and then above the warp yarns 34, 35, 36 and 37 forming a float which extends across four underlying yarns.

It will be understood that the floats are provided in a random or quasi random manner, with no immediate regular repeating pattern. Floats may extend over any number of underlying yarns, although in the preferred embodiments of the invention the maximum number of yarns passed over by a float is eight.

Figure 5:
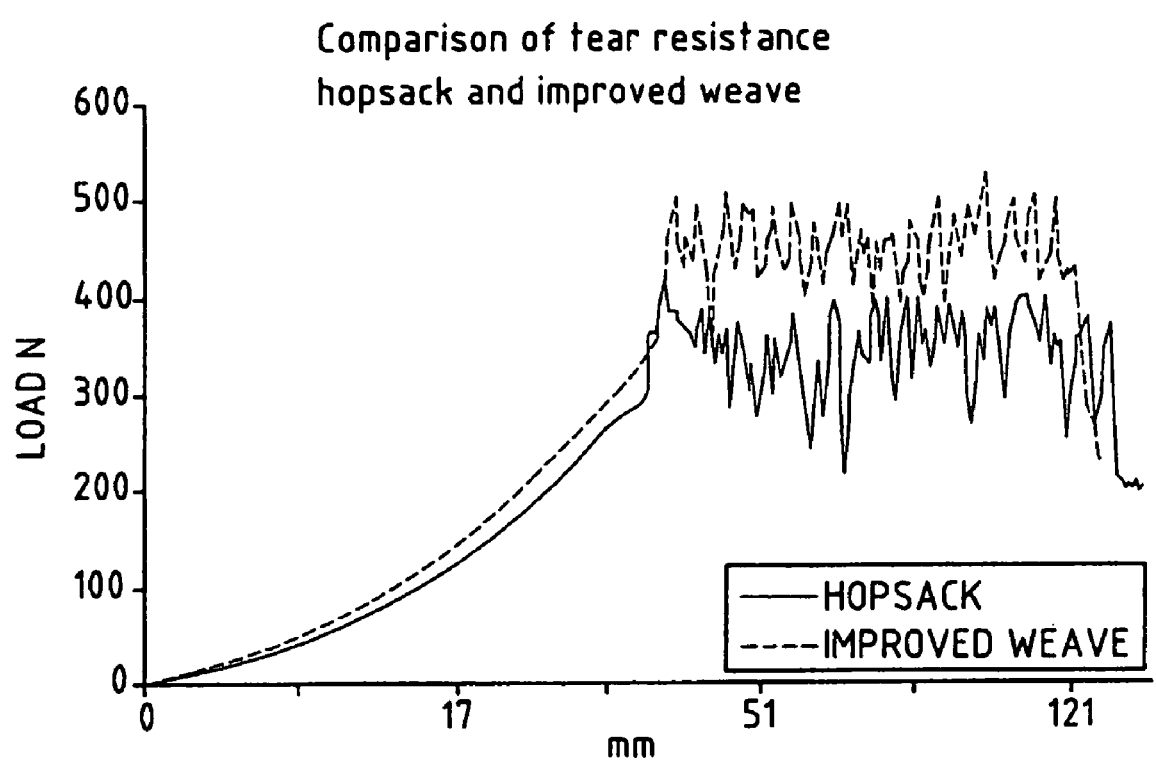
FIG. 5 is a graphical figure.

FIG. 5 is a graphical figure of load plotted against extension, illustrating a comparison of tear-resistance for a conventional hopsack weave and an example of the new improved weave described above.

It can be seen that the tear-resistance for the new weave is substantially greater than the tear-resistance of the conventional hopsack weave.

Whilst the invention has been described with reference to an air-bag in the form of an inflatable curtain, the invention is not restricted solely to air-bags of this type but may be utilised with any air-bag which has one or more mounts, such as apertured mounts. Thus the invention relates to an air-bag where the mount is a region surrounding a large opening that receives a gas generator, the region having apertures that receive bolts on the flange of the gas generator. The region may be formed from two super-imposed layers of fabric.

It has been found that by utilising a weave as described, an air-bag is provided having mounting tabs which have improved tear-resistance, but without tensile strength being compromised. The fabric is a flexible structure which facilitates the folding or assembly of the air-bag. The fabric is found to be more flexible than a conventional hopsack fabric. An air-bag is thus provided having enhanced strength, without the addition of separate reinforcements or the like. The overall weight and cost of the air-bag is thus not increased simply to enhance the tear-resistance of the mounting tabs.

When used in this Specification and Claims, the terms "comprises" and "comprising" and variations thereof mean that the specified features, steps or integers are included. The terms are not to be interpreted to exclude the presence of other features, steps or components.

The features disclosed in the foregoing description, or the following Claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An air-bag, the air-bag being formed from fabric and having an inflatable region and at least one mount, each mount being formed from fabric, woven to have a random or quasi-random distribution of floats, wherein the random or quasi-random distribution of floats are configured to have a non-repeating irregular weave for improved tear resistance.

2. An air-bag according to claim 1, wherein the floats each pass over between two and eight underlying yarns.

3. An air-bag according to claim 1, wherein each mount is formed from two adjacent layers of fabric.

4. An air-bag according to claim 3, wherein the two adjacent layers of fabric forming the mount are stitched together.

5. An air-bag according to claim 3, wherein the two adjacent layers of fabric forming the mount are laser-cut.

6. An air-bag according to claim 1, wherein each mount is a protruding mounting tab.

7. An air-bag according to claim 1, wherein each mount is apertured.

8. An air-bag according to claim 1, wherein the air-bag is an inflatable curtain.

9. An air-bag according to claim 8, wherein the inflatable curtain has an inflatable region formed by two super-imposed layers of fabric which are secured together at selected regions to form individual inflatable cells, there being a gas supply duct in fluid communication with the inflatable cells.

10. An air-bag, the air-bag being an inflatable curtain, the air-bag being formed from fabric and having an inflatable region formed by two super-imposed layers of fabric which are secured together at selected regions to form individual inflatable cells, there being a gas supply duct in fluid communication with the inflatable cells, the air-bag being provided with at least one mount, each mount being formed from fabric woven to have a random or quasi-random distribution of floats, each mount being in the form of a protruding mounting tab, the mounting tab being provided with an aperture, wherein the random or quasi-random distribution of floats are configured to have a non-repeating irregular weave for improved tear resistance.

11. An air-bag, the air-bag including an inflatable region having an upper-most edge seam and at least one mounting tab extending upwardly therefrom, the at least one mounting tab including an aperture and being formed from fabric woven to have a random distribution of floats, the random distribution of floats configured to have a non-repeating irregular weave for improved tear resistance.

12. The air-bag of claim 11, wherein the floats of the random distribution of floats each include a length such that the floats will pass over eight transversely extending yarns.

13. The air-bag of claim 11, wherein the air-bag is an inflatable curtain.

\* \* \* \* \*